3,108,096
PROCESS FOR NITROSATING CYCLOHEXYLIC
COMPOUNDS TO PRODUCE CAPROLACTAM
Werner Muench and Vincenzo Ruoti, Cesano Maderno,
and Luigi Notarbartolo, Milan, Italy, assignors to Snia
Viscosa Societa Nazionale Industria Applicazioni
Viscosa S.p.A., Milan, Italy, a company of Italy
Filed May 22, 1961, Ser. No. 111,715
Claims priority, application Italy May 25, 1960
5 Claims. (Cl. 260—239.3)

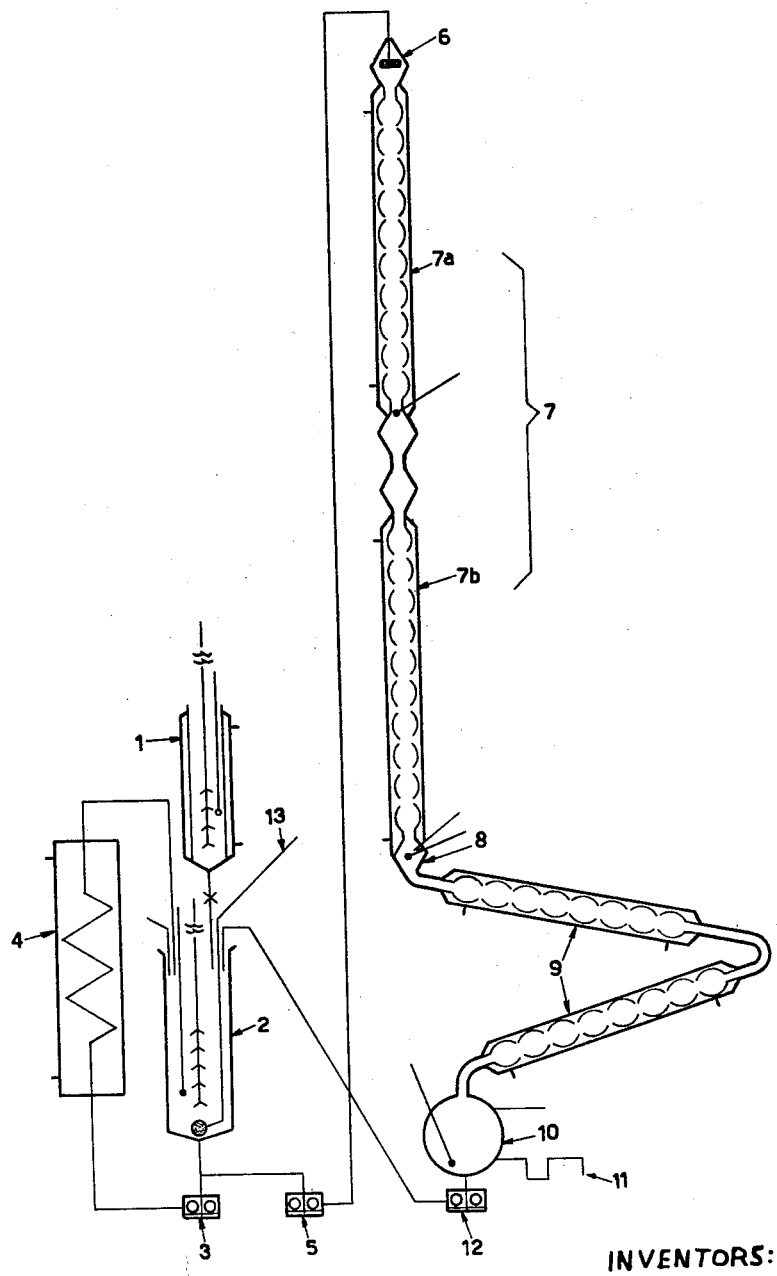

The present invention concerns an improvement in a process for nitrosating cyclohexylic compounds, in particular hexahydrobenzoic acid for the preparation of caprolactam.

It has been already proposed to prepare caprolactam by nitrosation in the presence of concentrated or fuming sulfuric acid, cyclohexylic compounds of formula

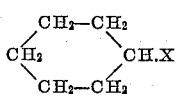

having a tertiary carbon atom, that is, a carbon atom connected to only one hydrogen atom, in particular hexahydrobenzoic acid and its derivatives. As nitrosating agents it is possible to employ various derivatives of nitrous acid, such as: nitrosyl sulfuric acid, nitrosyl sulfuric anhydride, nitrosyl chloride and bromide, salts of nitrous acid such as sodium nitrite, potassium nitrite, ammonium nitrite, alkyl nitrites of general formula RO.NO (where R is an alkyl radical) such as ethyl, amyl, propyl, butyl, nitrite, nitrous anhydride or gases containing it, nitrogen monoxide. Some of those derivatives are gaseous.

In carrying out the reaction, the cyclohexylic compound, the nitrosating agent and the sulfuric acid can be mixed in any order of succession. In particular, if the nitrosating agent is gaseous, it is possible to mix first the concentrated or fuming sulfuric acid with the cyclohexylic compound, for instance with the hexahydrobenzoic acid, and then to treat the mixture with the gaseous nitrosating agent.

The reaction described does not occur with significant speed below a temperature which varies according to the reactants employed; consequently, it may be carried out in various ways, be it by mixing the reactants at reaction temperature, be it instead by mixing them at a temperature at which they do not react in practice, and then heating the mixture to temperatures at which the reaction occurs with appreciable speed. The reaction leads direct to the lactam, with absorption of the NO ions and development of $CO_2$.

It is an object of the present improvement to provide a process for carrying out the above described reaction, characterized in that one prepares the mixture of the cyclohexylic compound with the sulfuric acid, concentrated or fuming, and the nitrosating agent at a temperature at which the nitrosation does not occur with sensible speed, which will be expressed shortly by saying that the mixture is made "in the cold," and then one heats the mixture obtained, in a thin layer, in such a way that the nitrosating reaction with formation of lactam takes place in small quantities of mixture a time. In particular it is possible to mix hexahydrobenzoic acid with oleum and nitrosating agent, at temperatures below 35° C., and preferably below 25° C., in particular about 10° C., and to heat the mixture in this layer at temperatures between 75 and 140° C., preferably around 90–95° C.

In a preferred embodiment of the process, one employs as a nitrosating agent nitrous anhydride $N_2O_3$. Also other agents may be employed however, in particular nitrosyl sulfate.

Other cyclohexylic compounds that may be employed are in particular ketones of general formula

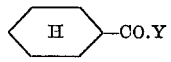

wherein Y is a radical, substituted and not substituted, aliphatic, aromatic, alicyclic, or mixed.

If hexahydrobenzoic acid is employed, the molar ratio between the nitrosating agent (calculated as NO) and the hexahydrobenzoic acid, is preferably comprised between 1:1.2 and 1:3; but also other ratios are admissible, comprised between 1:1 and 1:10. The molar ratio between nitrosating agent and sulfuric agent (calculated as $SO_3$) is between 1:2 and 1:8 and preferably comprised between 1:3 and 1:4. Since oleum is the starting material, a part of the sulfuric acid is present in the shape of sulfuric anhydride.

The nitrosating agent $N_2O_3$ reacts with sulfuric acid according to the following scheme:

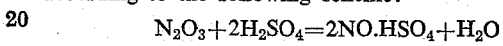

and if free sulfuric anhydride is present:

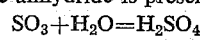

Thus in the nitrosating mixture, nitrosyl sulfate is formed, without needing to prepare it in a special operation and with special apparatus equipment.

Then for every $N_2O_3$ molecule, one molecule of water is formed, which with free sulfuric anhydride forms sulfuric acid. The content of free sulfuric anhydride in the acid, therefore, lowers during the reaction. It is preferably calculated in such a way that after the absorption of $N_2O_3$ there remains an oleum with 10 to 20% of $SO_3$. In practice one starts generally from an oleum with about 30% of $SO_3$ to find again about 20% at the end of the reaction. However also oleum with higher percentages of $SO_3$ may be employed. These higher percentages increase the yield of lactam as referred to the nitrosating agent, but they diminish it as referred to the starting hexahydrobenzoic acid. In any case, in calculating the percentage of free $SO_3$ one should take into account any possible moisture contained in the nitrosating gas, in particular if it is obtained by combustion of the ammonia.

In putting the invention into practice, the content of $N_2O_3$ in the reaction mixture prepared in the cold, should be brought up to 0.5–1.5% as calculated a percent by weight of NO, prior to effecting the heating. Higher or lower percentages are admissible, but the former would lead to an exceedingly vivacious reaction and also to an explosive one, while the latter would give low rates of conversion of the hexahydrobenzoic acid.

Preferably the mixing of the agents and the reaction, are effected in the presence of some of the product of the very reaction and that, therefore, contains lactam in addition to cyclohexylic compound, in particular unreacted hexahydrobenzoic acid and oleum. If the operation is carried out batchwise (discontinuously), repeating the reaction cyclically, the starter is the product of a preceding cycle while if the operation is continuous, it is constituted by a portion of the recycled final product. The use of the starter permits better control of the reaction absorbing part of the heat of reaction and at the same time the possibility of convenient production per hour, though maintaining low contents of NO.

Now an example of embodiment of the invention will be described in which the operation is continuous, with reference to the accompanying drawing illustrating a diagrammatical representation of the apparatus equipment for carrying out the process.

*Example*

20 kg. of lactamic solution (prepared according to any one of the two methods described hereinafter), are added in one hour to a mixture of 384 g. of hexahydrobenzoic acid and 343 g. of oleum with 35% of free SO₃ and contemporaneously are saturated in an absorber 2 with 38 g. of N₂O₃ (titrated iodometrically) up to a maximum concentration (expressed as NO) of 1.1% by weight on the mass. The heat of formation of the nitrosyl sulfate in the absorber is eliminated by means of circulation of the mass to be saturated, through a coil 4 cooled down to −18° C. At the end of saturation the mass is made to pass by means of a small pump (gear pump 5) at the speed of 30 cc./minute, through a reaction tube of glass, vertical and with undulated surface 7, which is 120 cm. long, heated externally by oil at 100° C. In the example illustrated, the tube is in two sections 7a and 7b, having the structure of bubble coolers. At the end of the reaction tube there is provided a tube 8 for venting the CO₂ which develops during the reaction.

The product of reaction passes through a cooler 9 cooled down to −18° C. (which too is in two sections in the example illustrated) and is collected in a flask 10 from which by means of an overflow 11 there is ensured the discharge of the part of product of reaction exceeding the quantity which is recycled as a bottom body. In the present example, 710 g. are discharged per hour at 11. The difference between the quantity of mixture of hexahydrobenzoic acid and oleum initially charged and the quantity of product of reaction so discharged in the same period of one hour, is due to mechanical losses (material remaining in the tubes) and to chemical losses ($CO_2$ and also $SO_2$ which are lost in the reaction of lactamization). The remaining 2000 g. of product of reaction are sent back by means of a pump 12, again in one hour's time, to the absorber 2 and there are added thereto, again in one hour, further 727 g. of fresh mixture of hexhydrobenzoic acid and 35% oleum, in the same proportions of 384:343 g. as prepared in the mixer 1, re-saturated in equal intervals of time with a new stream of about 38 g. of $N_2O_3$ and then made to pass into the reactor. So the preceding cycle is repeated as many times as wanted.

The reaction mass separated every hour from the overflow, about 715–720 g. every time, is hydrolized with water and ice, is extracted with other to separate the hexhydrobenzoic acid that has not reacted and that is recycled, neutralized to pH 7 and finally treated with chloroform to extract the lactam.

Thereby are obtained as an average 88 g. of crude lactam, which represents the hourly production of the apparatus and 268 g. of hexahydrobenzoic acid are recovered, which correspond to a yield of crude lactam equal to 86%, calculated on the hexahydrobenzoic acid consumed and of 78% calculated on the $N_2O_3$ absorbed. The product of reaction had a concentration of 20.1% of lactam in $H_2SO_4$, the concentration being calculated taking into account only these two components.

The mixture, that serves at the beginning of the process as a starter to start the first cycle, may be prepared in various manners of which two examples are given:

(1) 282 g. of oleum (40% of SO₃) and 960 g. of hexahydrobenzoic acid are mixed slowly and are cooled down to 20–25° C. To this mixture are added gradually, while stirring at 80–85° C., 695 g. of NOHSO₄ in H₂SO₄ (with 47% of NOHSO₄). The reacted mixture contains 20.5% of lactam in H₂SO₄.

(2) At the temperature of 30–32 C., 1152 g. of hexahydrobenzoic acid and 927 g. of oleum with 27% of SO₃, are mixed. The mass is agitated continuously, cooling it down to 25° C. (inner temperature). Then in the cold there are introduced (at 12–16° C.) 28 g. of N₂O₃ and the mass is passed into the reactor tube 7. Again 28 g. of N₂O₃ are added and the reaction is repeated.

Further 60 g. of oleum with 60% of SO₃ and 28 g. of N₂O₃ are added and the reaction is repeated. Again 33 g. of oleum with 60% of SO₃ are added as well as 28 g. of N₂O₃ and the reaction is repeated. At the end of these four operations the mass has a concentration of 20.2% of lactam in H₂SO₄.

The example described is not limitative, since numerous variants may be effected by the skilled in the art. The yields and concentrations obtained are as a rule of the same order as those of the example.

In the same way, with the modifications in the choice of the skilled in the art, other cyclohexylic compounds may be elaborated. If for instance ketones are employed, the temperature at which the reactants are mixed and the nitrosating agent is added, is between −5° C. and −20° C. and preferably of about −10° C. while the reaction takes place at +20 to 30° C.

We claim:

1. In a process for the preparation of caprolactam by treating in the presence of an acid agent selected from the group consisting of concentrated sulfuric acid and oleum, with a nitrosating agent capable of providing NO ions in the reaction mixture, a starting compound chosen from the group consisting of hexahydrobenzoic acid and its functional derivatives and cyclohexylketones of the general formula

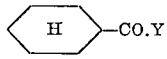

wherein Y is a hydrocarbon radical, the improvement consisting in mixing the starting compound with the acid agent and the nitrosating agent at a temperature below 35% C., subsequently spreading the mixture in a thin layer, and heating the same to nitrosating temperatures between 90° C. and 95° C. at which the formation of caprolactam occurs.

2. In a process for the preparation of caprolactam by treating in the presence of an acid agent selected from the group consisting of concentrated sulfuric acid and oleum, with a nitrosating agent capable of providing NO ions in the reaction mixture, a starting compound chosen from the group consisting of hexahydrobenzoic acid and its functional derivatives and cyclohexylketones of the general formula

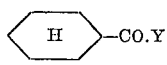

wherein Y is a hydrocarbon radical, the improvement consisting in mixing the starting compound with the acid agent and the nitrosating agent at a temperature below 35° C., subsequently spreading the mixture in a thin layer, heating the same to nitrosating temperatures between 90° C. and 95° C. at which the formation of caprolactam occurs, cooling the reaction mixture to below 35° C., discharging part of said mixture as a product, adding a further amount of starting material, sulfuric acid and nitrosating agent to the remaining reaction mixture, and cyclically repeating the aforementioned operation.

3. In a process for the preparation of caprolactam by treating in the presence of an acid agent selected from the group consisting of concentrated sulfuric acid and oleum, with a nitrosating agent capable of providing NO ions in the reaction mixture, a starting compound chosen from the group consisting of hexahydrobenzoic acid and its functional derivatives and cyclohexylketones of the general formula

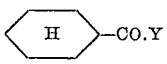

wherein Y is a hydrocarbon radical, the improvement comprising continuously mixing starting compound, acid agent, nitrosating agent and previously reacted mixture at temperatures below 35° C., subsequently continuously spreading the mixture in a thin layer and heating the same to nitrosating temperatures between 75° C. and 140° C. at which formation of caprolactam occurs, continuously cooling the reaction mixture to below 35° C., continuously discharging a portion of said reacted mixture as product and continuously recycling the remaining portion of said reacted mixture to mix the same with starting compound, sulfuric acid and nitrosating agent.

4. In a process for the preparation of caprolactam by treating in the presence of an acid agent selected from the group consisting of concentrated sulfuric acid and oleum, with a nitrosating agent capable of providing NO ions in the reaction mixture, a starting compound chosen from the group consisting of hexahydrobenzoic acid and its functional derivatives and cyclohexylketones of the general formula

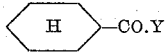

wherein Y is a hydrocarbon radical, the improvement consisting in mixing the starting compound with the acid agent and the nitrosating agent at a temperature below 35° C., subsequently spreading the mixture in a thin layer, and heating the same to a temperature between 75° C. and 140° C. to effect formation of caprolactam.

5. In a process for the preparation of caprolactam by treating in the presence of an acid agent selected from the group consisting of concentrated sulfuric acid and oleum, with a nitrosating agent capable of providing NO ions in the reaction mixture, a starting compound chosen from the group consisting of hexahydrobenzoic acid and its functional derivatives and cyclohexylketones of the general formula

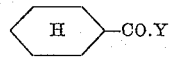

wherein Y is a hydrocarbon radical, the improvement consisting in mixing the starting compound with the acid agent, the nitrosating agent and some of the product of the reaction at a temperature below 35° C., heating the mixture to a temperature between 75° C. and 140° C., discharging part of the product of the reaction, and mixing the remaining part of the product of the reaction with additional acid agent, nitrosating agent, and starting compound, and carrying out the reaction again as recited above to form more product.

References Cited in the file of this patent

Australian Abstract No. 52,901, Sept. 18, 1959.
Australian Abstract No. 52,908, Sept. 18, 1959.
Australian Abstract No. 58,823, Mar. 28, 1960.